(12) United States Patent
Waldmann

(10) Patent No.: US 6,499,850 B2
(45) Date of Patent: Dec. 31, 2002

(54) REARVIEW MIRROR FOR VEHICLES, IN PARTICULAR, MOTOR VEHICLES

(75) Inventor: Bernd Waldmann, Nürtingen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 10/012,966

(22) Filed: Nov. 30, 2001

(65) Prior Publication Data

US 2002/0097494 A1 Jul. 25, 2002

(30) Foreign Application Priority Data

Dec. 2, 2000 (DE) .................................. 200 20 495 U
May 4, 2001 (DE) .................................. 201 08 205 U

(51) Int. Cl.$^7$ ................................................ G02B 5/08
(52) U.S. Cl. ...................... 359/603; 359/604; 359/608; 359/267
(58) Field of Search ................................ 359/603, 604, 359/608, 265, 267, 272, 275, 513, 514, 515

(56) References Cited

U.S. PATENT DOCUMENTS 4,822,157 A * 4/1989 Stout ........................... 248/479
5,790,298 A * 8/1998 Tonar .......................... 359/265
6,294,233 B1 * 9/2001 Barth et al. ................... 428/14

* cited by examiner

*Primary Examiner*—Mohammad Sikder
(74) *Attorney, Agent, or Firm*—Gudrun E. Huckett

(57) ABSTRACT

A rearview mirror for vehicles has a housing having a receiving opening for receiving an electrochromic mirror of a mirror glass and a cover glass. At least one seal is arranged in an edge area of the mirror glass and of the cover glass and extends at least over a portion of the circumference of the edge area of the mirror glass and the cover glass, respectively. The housing has a rim engaging the electrochromic mirror, wherein the rim, in the viewing direction onto the rearview mirror, has a part positioned in front of the seal to cover the seal from view. The part of the rim positioned in front of the seal is made of a transparent material and has a backside provided with a reflective metal coating.

8 Claims, 3 Drawing Sheets

REARVIEW MIRROR FOR VEHICLES, IN PARTICULAR, MOTOR VEHICLES

BACKGROUND OF THE INVENTION

1. Field of the Invention

The invention relates to a rearview mirror for vehicles, in particular, motor vehicles, comprising a housing having a receiving opening for an electrochromic mirror having a mirror glass and a cover glass between which at least one seal is positioned at least over a part of the circumference of their edge area, wherein in front of the seal a rim of the housing is positioned which engages the electrochromic mirror and covers the seal from view.

2. Description of the Related Art

In the case of electrochromic mirrors (EC mirrors) a seal is positioned between the mirror glass and the cover glass. In order for the seal not to be visible through the cover glass, the frame of the housing is extended so far that it is positioned in front of the seal and covers it in the viewing direction onto the mirror glass.

SUMMARY OF THE INVENTION

It is an object of the present invention to configure the rearview mirror of the aforementioned kind such that covering the seal in the electrochromic mirror is possible in a simple way.

In accordance with the present invention, this is achieved in that the part of the housing rim positioned in the area in front of the seal is comprised of transparent material and is provided at its backside with a reflective metal coating.

In the rearview mirror of the invention, which can be an interior as well as an exterior rearview mirror, the part of the housing rim which, in the viewing direction onto the mirror glass, is positioned in front of the seal is comprised of a transparent material. At its backside, this part is provided with a reflective metal coating which prevents that the seal is visible from the exterior.

DESCRIPTION OF THE PREFERRED EMBODIMENTS

Figure 1:
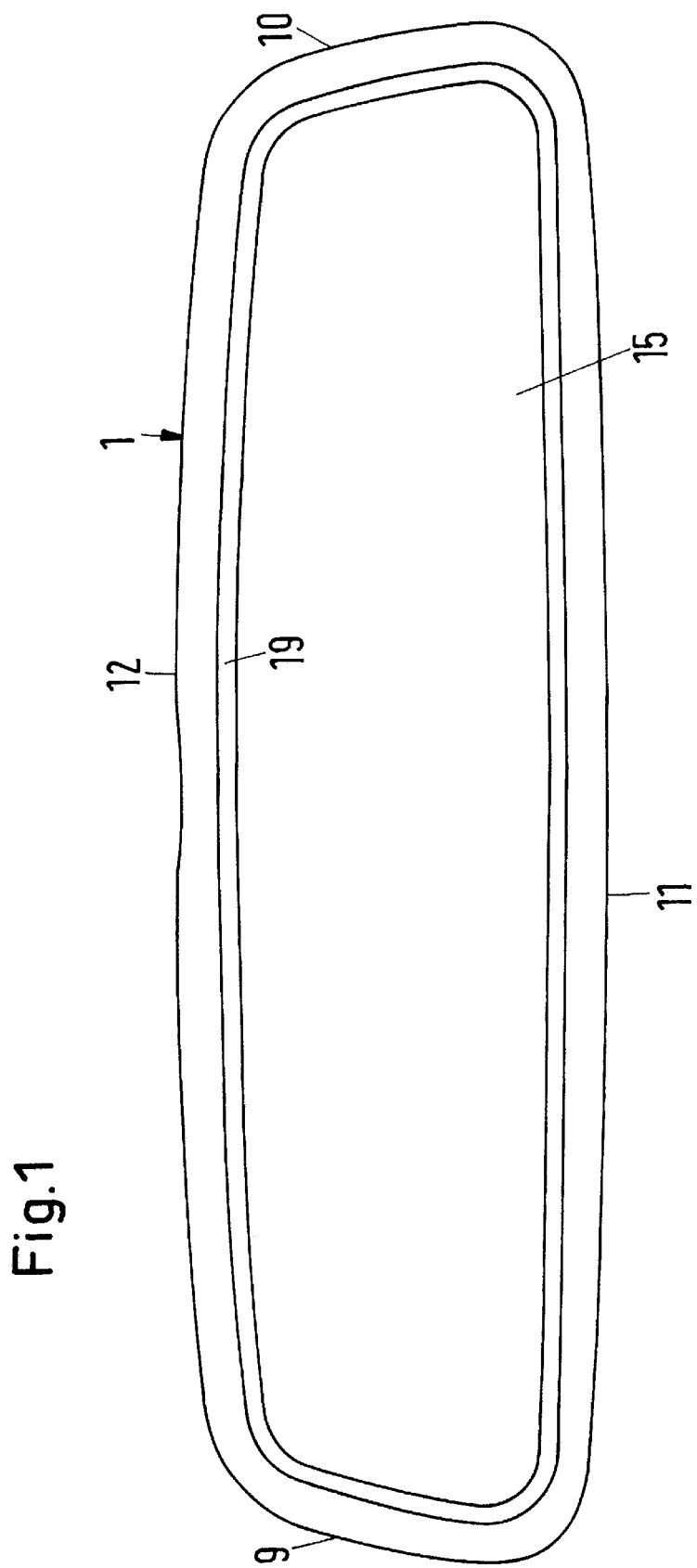
FIG. 1 is a front view of an interior rearview mirror according to the invention.

The interior rearview mirror has a housing 1 which at its upper side has a through opening 2 (FIG. 2) for a mirror base 3 with which the interior rearview mirror is fastened in the vehicle in a manner known in the art. In the housing 1 a support 4 is provided which has a joint receptacle (socket) 5 for a joint ball 6 which is provided at the free end of an arm 7 of the mirror base 3 penetrating the through opening 2. By means of this ball-and-socket joint the interior rearview mirror can be position-adjusted relative to the motor vehicle.

The housing 1, when viewed in cross-section, is bulgy and has in a front view (FIG. 1) approximately a rectangular shape. The housing 1 has a bulgy rear wall 8 having a transition into sidewalls 9, 10 (FIG. 1), a bottom wall 11, and a top wall 12. A circumferential frame 13 adjoins the free ends of the housing walls 9 through 12. In the illustrated embodiment, the frame 13 is detachably connected to the walls 9 through 12, but it can also be fixedly (non-detachably) connected to the housing walls 9 through 12.

On the support 4 a mirror glass 14 is positioned on which a cover glass 15 is arranged. The two glass parts 14, 15 are parts of an electrochromic mirror. Between the mirror glass 14 and the cover glass 15 a circumferential seal 16 is positioned which prevents penetration of moisture into the space between the two glass parts 14, 15 and/or the leakage of the electrochromic medium.

Figure 2:
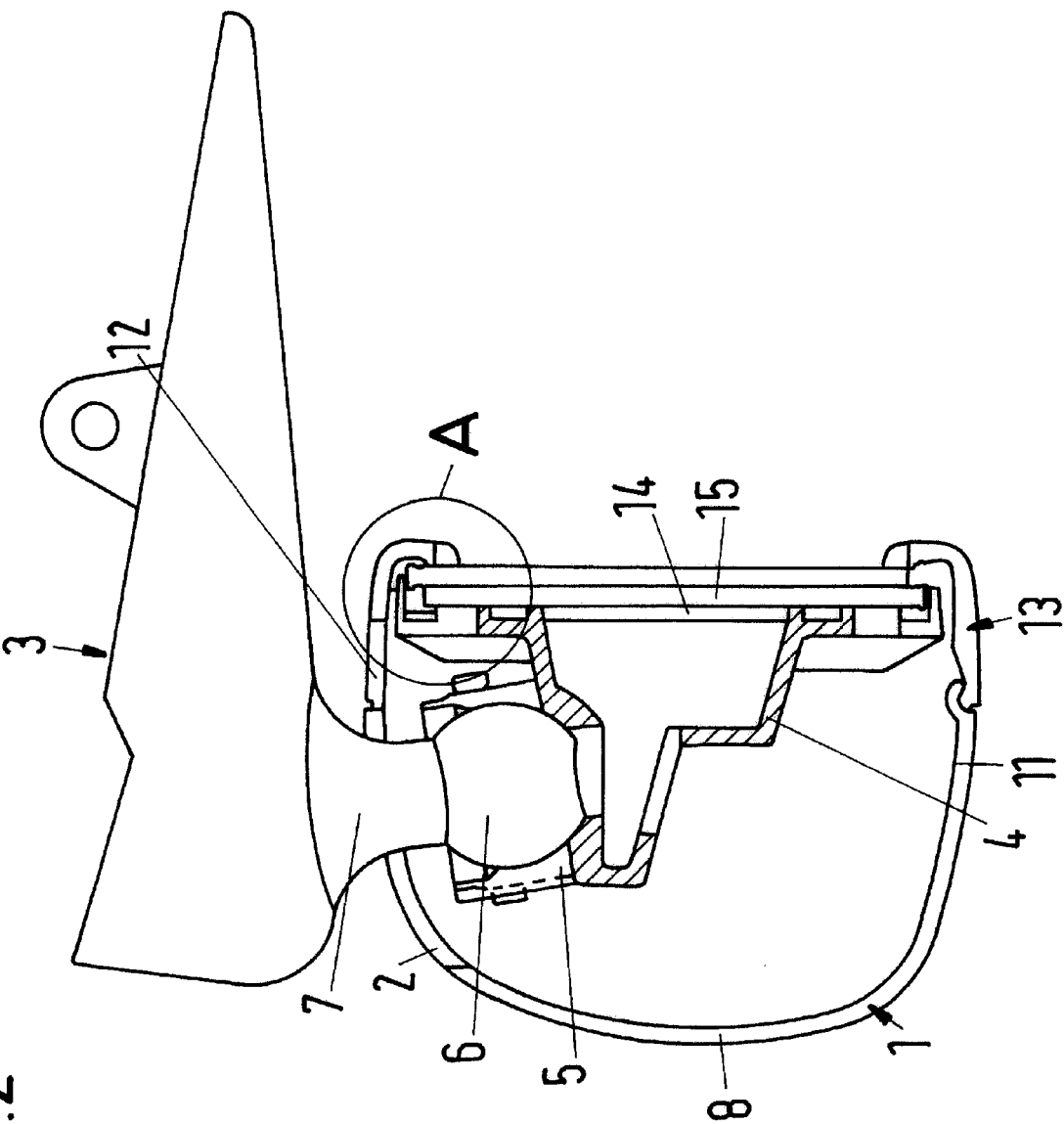
FIG. 2 is a cross-section of the interior rearview mirror according to FIG. 1.
Figure 3:
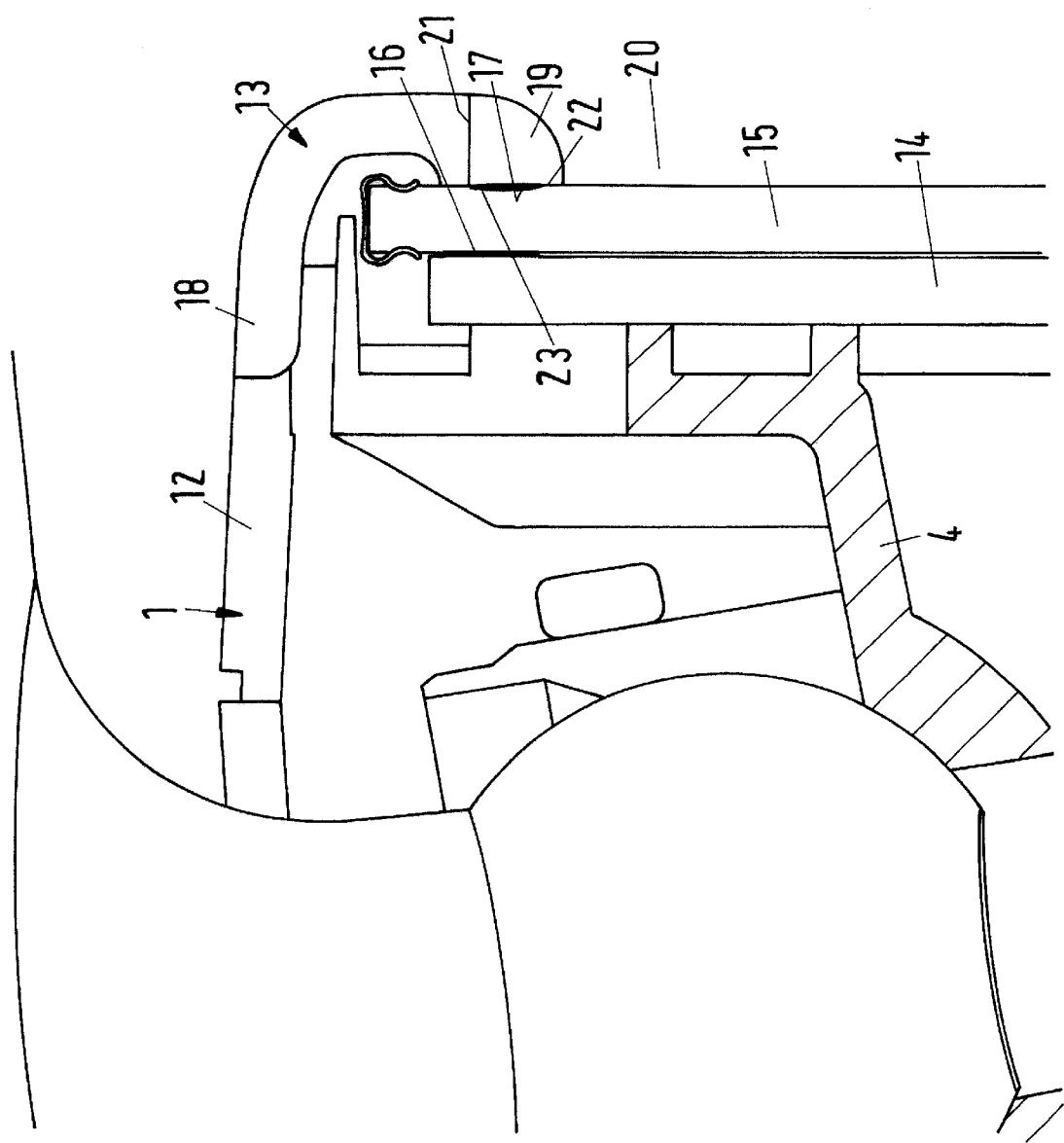
FIG. 3 is a detail III of FIG. 2 on an enlarged scale.

The circumferential or peripheral frame 13 engages with its free end or rim the electrochromic mirror (14, 15) at its edge. The frame 13 rests with its planar surface 17 (FIG. 3) areally on the cover glass 15. In this way, the electrochromic mirror 14, 15 is secured between the support 4 and the frame 13. The frame 13 is comprised of two frame parts 18 and 19. The inner frame part 19 delimits a mounting opening 20 for the electrochromic mirror 14, 15. The inner frame part 19 has in cross-section approximately a quarter circle shape and is positioned areally with its planar outwardly facing sides on the cover glass 15 as well as on a planar end face 21 of the frame part 18. The frame 13 forms a continuous extension of the housing 1, i.e., the outer sides of the housing 1 and of the frame 13 have a continuous transition into one another (form a continuous contour). As is illustrated in FIGS. 2 and 3, the frame 13 surrounds the electrochromic mirror 14, 15 at a spacing and rests only with the support surface 17 against the exterior side of the cover glass 15.

The frame part 18 adjoining the housing 1 is comprised of an opaque material, in particular, of a plastic material that is opaque. This opaque material can be colored, for example, to match the color scheme of the motor vehicle. The frame part 19, on the other hand, is comprised of a transparent, in particular, a clear material. Accordingly, in order to not be able to see the seal 16 between the two glass parts 14, 15 through this frame part 19, the backside 22 of the frame part 19 resting against the cover glass 15 is provided with a reflective metal coating 23. This reflective coating is provided such that the seal 16 is covered when viewed from the exterior. Since the frame part 19 is of transparent, in particular, clear material, this frame part 19 is not disruptive because it is hardly distinguishable from the cover glass 15.

It is possible to produce the area of the frame part 18 adjoining the frame part 19 also of a transparent, in particular, clear material. In this case, the reflective metal coating 23 is to be provided also at the inner side of this area of the frame part 18 resting against the cover glass 15. The reflective coating or material 23 can be connected in a simple way to the frame 13 and requires only a minimal mounting space. The reflective coating or material 23 is provided only in those areas of the frame 13 through which the seal 16 between the two glass parts 14, 15 of the electrochromic mirror can be viewed from the exterior. As long as the frame 13 is opaque in the area in front of the seal 16, a reflective material 23 is not required.

The mirror configuration as described in connection with FIGS. 1 through 3 can, of course, also be used in connection with exterior rearview mirrors of motor vehicles.

While specific embodiments of the invention have been shown and described in detail to illustrate the inventive principles, it will be understood that the invention may be embodied otherwise without departing from such principles.

What is claimed is:

1. A rearview mirror for vehicles comprising:

a housing having a receiving opening configured to receive an electrochromic mirror comprised of a mirror glass (14) and a cover glass (15) and at least one seal (16) arranged in an edge area of the mirror glass (14) and of the cover glass (15) and extending at least over a portion of the circumference of the edge area of the mirror glass (14) and the cover glass (15), respectively;

the housing having a rim (13) engaging the electrochromic mirror, wherein the rim (13), in the viewing direction onto the rearview mirror, has a part positioned in front of the seal (16) to cover the seal (16) from view;

the part of the rim (13) positioned in front of the seal (16) being comprised of a transparent material and having a backside provided with a reflective metal coating (23).

2. The rearview mirror according to claim 1, wherein the housing has a frame (13) delimiting a receiving opening (20) for the electrochromic mirror (14, 15) and wherein the rim (13) is part of the frame.

3. The rearview mirror according to claim 2, wherein the frame (13) is comprised of two circumferentially extending frame parts (18, 19).

4. The rearview mirror according to claim 3, wherein one of the frame parts is an inner frame part (19) comprised of transparent material at least in the area of the reflective metal coating (23).

5. The rearview mirror according to claim 4, wherein the transparent material is a clear material.

6. The rearview mirror according to claim 4, wherein one of the frame parts is an outer frame part (18) comprised of opaque material.

7. The rearview mirror according to claim 1, wherein the rearview mirror is an interior rearview mirror or an exterior rearview mirror.

8. The rearview mirror according to claim 1, wherein the rim (13) rests with the reflective metal coating (23) areally against the cover glass (15).

* * * * *